March 13, 1945.  J. H. BENSON  2,371,215

REFRIGERATING APPARATUS

Filed Feb. 3, 1937   12 Sheets-Sheet 1

INVENTOR.
John H. Benson

BY
Barnes, Kisselle, Laughlin & Raisch
ATTORNEYS

March 13, 1945. J. H. BENSON 2,371,215
REFRIGERATING APPARATUS
Filed Feb. 3, 1937    12 Sheets-Sheet 2

INVENTOR.
John H. Benson
BY
Barnes, Kisselle, Laughlin & Raisch
ATTORNEYS

March 13, 1945.  J. H. BENSON  2,371,215
REFRIGERATING APPARATUS
Filed Feb. 3, 1937   12 Sheets-Sheet 3

INVENTOR:
John H. Benson
BY
Burnes, Kissell, Laughlin & Raisch
ATTORNEYS

INVENTOR.
John H. Benson

March 13, 1945.  J. H. BENSON  2,371,215
REFRIGERATING APPARATUS
Filed Feb. 3, 1937   12 Sheets-Sheet 10

INVENTOR.
John H. Benson
BY
ATTORNEYS

March 13, 1945.   J. H. BENSON   2,371,215
REFRIGERATING APPARATUS
Filed Feb. 3, 1937   12 Sheets-Sheet 11

INVENTOR.
John H. Benson
BY
Barnes, Kisselle, Laughlin & Raisch
ATTORNEYS

March 13, 1945.  J. H. BENSON  2,371,215
REFRIGERATING APPARATUS
Filed Feb. 3, 1937  12 Sheets-Sheet 12

INVENTOR.
John H. Benson
BY
Barnes, Kisselle, Laughlin & Raisch
ATTORNEYS

Patented Mar. 13, 1945

2,371,215

UNITED STATES PATENT OFFICE 2,371,215

REFRIGERATING APPARATUS

John H. Benson, Salem, Ohio, assignor to Mullins Manufacturing Corporation, Salem, Ohio, a corporation of New York Application February 3, 1937, Serial No. 123,892

23 Claims. (Cl. 62—126)

This invention relates to Refrigerating apparatus, and more particularly to evaporators of the sheet metal type; and has especially to do with an unusually compact and efficient evaporator which may be used efficaciously with any type of regulating device.

Heretofore, refrigerant evaporators have generally been designed for a definite type of refrigerant system, the most important of which have been flooded evaporators for use with low side floats, flooded evaporators for use with high side floats and dry expansion evaporators. In most flooded type evaporators, whether designed for a low side or a high side float, it is necessary for the evaporated refrigerant to take a long path through the liquid refrigerant up to the header or headers where a relatively large volume of liquid refrigerant and oil is usually maintained, and it was necessary for this entrained gas from evaporation to break through the blanket of refrigerant and oil to enter the gas space at the top of the header or headers. As a result of this construction, it has been the general rule to provide special oil return devices and various means to eliminate gas pockets. Improper circulation of refrigerant, due to the height the gas had to travel to escape to the gas dome, and the oil logging conditions prevailing in many types of evaporators, resulted in erratic performance and non-uniform temperatures at different points in the evaporator. In many cases the gas became superheated causing wide variations in wall temperatures of the evaporator.

In the case of so-called dry expansion evaporators one of the most serious problems that has generally been encountered is that of frost back, which is due to the trapping of liquid refrigerant and oil on the off cycle so that, when the compressor starts up, slugs of refrigerant are whipped through the passageways and enter the suction line before complete evaporation. The passageways of dry coil evaporators are usually of the same cross section throughout and any liquid in the horizontal run will reduce the gas area thereby increasing the velocity of the gas which will in turn carry over liquid during the running cycle as well as at the start. Many devices have been used in an attempt to counteract this frost-back.

It is the purpose of the present invention to provide an evaporator which overcomes the main faults and objections of different types of evaporators, such as enumerated above, and which evaporator, largely by reason of the manner in which it overcomes the faults and objections of the prior art, adapts itself to various types of control means or metering devices including, for instance, high side floats, low side floats, capillary tubes, cneck valves and expansion valves. More specifically, the present invention contemplates what might be termed an extended refrigerant surface evaporator, so formed as to provide a large number of horizontal shallow liquid depressions so connected together as to maintain a gas space over every part of the liquid evaporating surface; the amount of liquid in each horizontal depression or passage being so small that any gas evaporated has only a very short distance to travel to the gas space.

An important feature of the present invention resulting from the extended refrigerant surfaces, is that the head against which the gas must move has been reduced to a point where it is negligible; the direct result being the elimination of gas pockets and oil logging.

Still other features have to do with an evaporator structure so constructed as to not inherently cause any pressure drop, resulting in a uniform temperature throughout the evaporator and eliminating any efficiency losses due to false evaporator pressures. Another feature is the provision of such a structure that no slugging over of liquid at the start of the cycle can take place, because of the maintenance of a constant overhead gas passage which affords direct communication throughout the evaporator from the point of entrance of the refrigerant into the evaporator to the compressor crank case.

A further feature of the present invention has to do with an evaporator of increased efficiency due to the reduction of the oil blanket to a negligible minimum and due to the provision of a relatively large evaporating surface area in proportion to the amount of refrigerant in the evaporator. Still other important features reside in the provision of an evaporator having connected bodies of refrigerant and passageways of such size that the gas velocity of the liquid between bodies of refrigerant is relatively high and the gas velocity over the liquid refrigerant is relatively low; the depressions and passageways for liquid and gas being so shaped and arranged that the gas velocity will carry any overflow of refrigerant or oil into the next depression or body of liquid, whether above or below the preceding depression or body of liquid. This latter feature of the evaporator that permits efficient operation regardless of the direction of flow of refrigerant is a very important one in this case.

Other features having to do with details of structure, and arrangement and cooperation of parts, will be more clearly set forth in the specification and claims.

Various attempts have been made to provide dams or special coils and fittings in coil type cooling units, such as shown in the patents to Shipman 1,836,090, Gunn 1,760,195 and Wheaton 1,833,698. However, such coil type cooling units, as shown by the above patents, do not provide for flow of refrigerant and gas in either direction, and the coils are so arranged that the velocity of the gases is greatest over the liquid surface.

The present invention not only contemplates a novel, compact and unusually cheap evaporator, but has to do with an evaporator which automatically, or what might be said inherently, adapts itself to any type of control, as distinguished from some controls which adapt themselves to various types of evaporators; furthermore, the evaporator of the present invention maintains a gas space over every part of the liquid evaporating surface, and which means a free gas passage throughout the complete evaporator; furthermore, the cross sectional area of gas passageways and liquid reservoirs are so proportioned as to control the velocity of the gas at the proper points, making possible an evaporator in which the flow of refrigerant may be in either direction. The above important features are all present in the illustrated embodiments and should be borne in mind in reading the following description.

The preferred embodiments of the present invention follow in a manner the prior art of sheet metal evaporators, in that, as best shown in Figs. 1 to 5, the evaporator consists of an outer shell generally designated 2 and an inner shell generally designated 3, the embossed portions being preferably formed in the respective shells while in the flat, the shells then superimposed, or bent over from a single piece, so that the embossed portions register. The respective shells are then welded together at points around and in between the embossed portions, as at 4, while still in the flat, and then bent to the shape desired, which might be the shape shown in Fig. 3, or Fig. 7 or 14 as possible variations. Fabrication of the present evaporator varies from standard sheet metal evaporator construction in that the embossed portions are so fabricated as to form a plurality of reservoirs, preferably connected in a continuous path, and a particularly novel feature is that the reservoirs and connecting passageways are so shaped and arranged that spaced shallow bodies of liquid are distributed over the top, bottom and sides of the evaporator; a continuous gaseous path is maintained throughout the evaporator and the respective openings into the evaporator may be used either as inlet or outlets.

Figure 1:
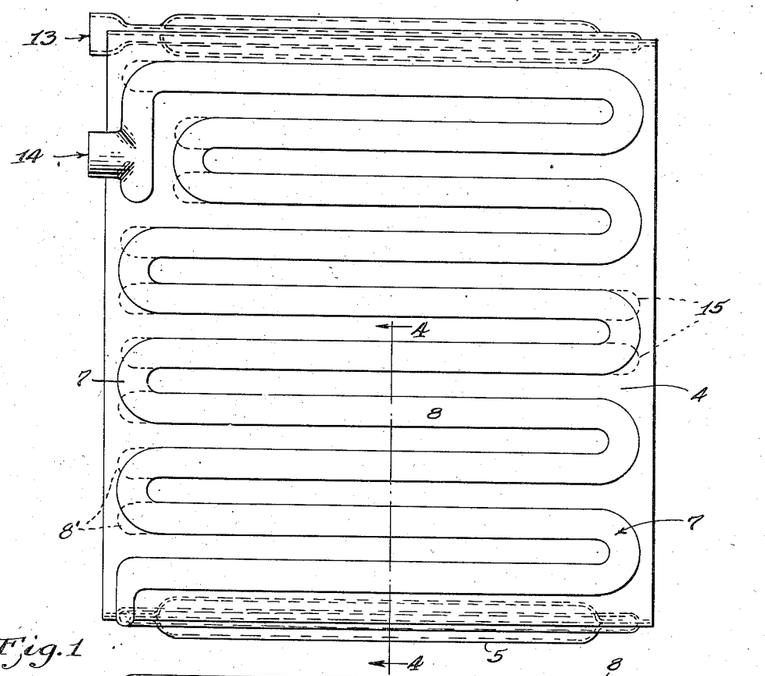
Fig. 1 is a plan view of one form of evaporator embodying the present invention, wherein the continuous connected headers forming extended refrigerant surfaces is well illustrated.
Figure 2:
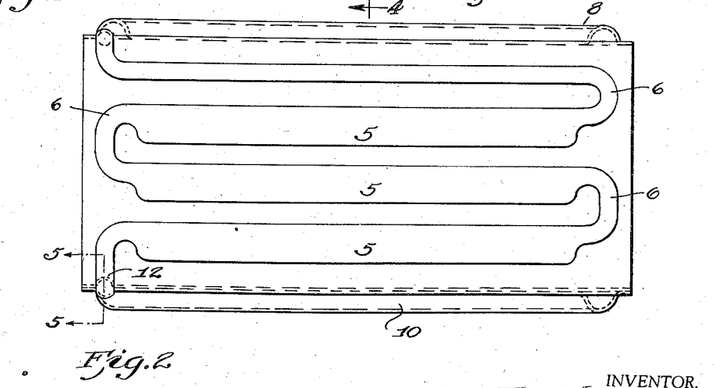
Fig. 2 is an end elevation of the structure shown in Fig. 1, and illustrating particularly the manner of connecting the successive horizontal embossed portions forming the refrigerant bodies or depressions.
Figure 3:
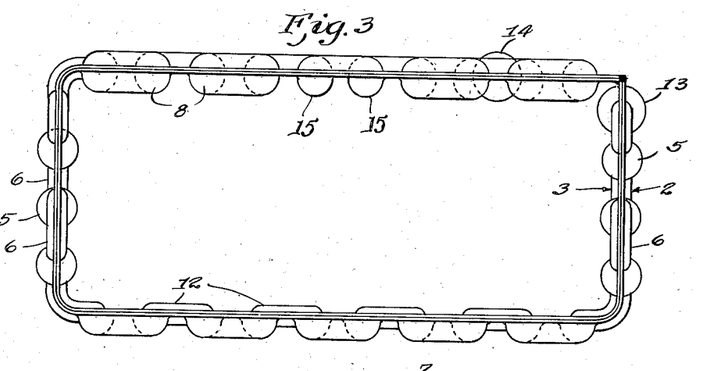
Fig. 3 is a front view of the evaporator shown in Figs. 1 and 2 and showing the manner of connecting together the reduced and enlarged portions which form a continuous conduit between the inlets or outlets, as the case may be.
Figures 4, 5:
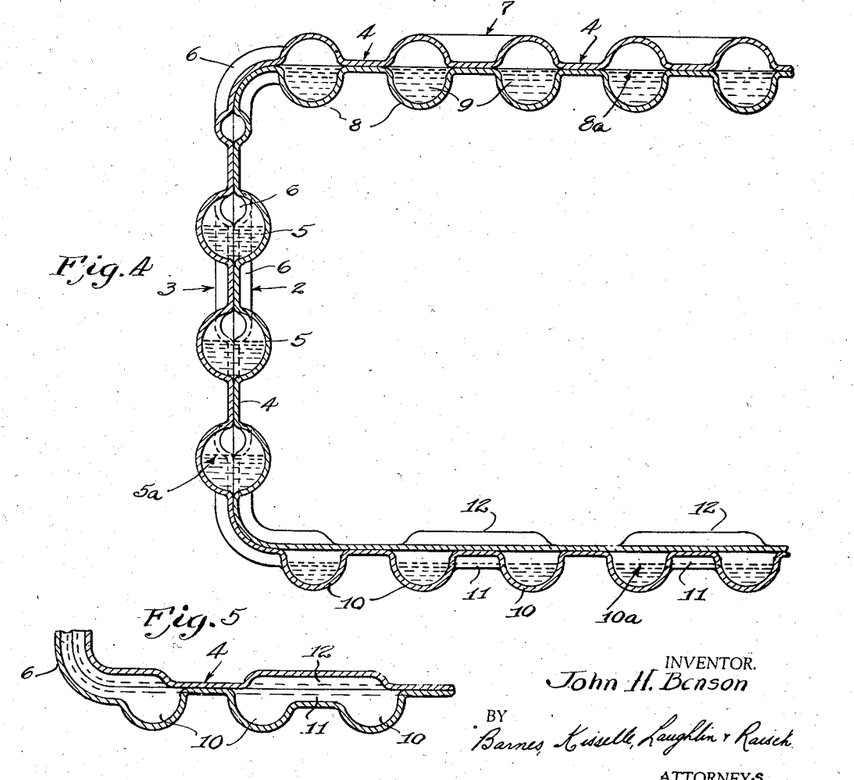
Fig. 4 is a sectional view taken on line 4—4 of Fig. 1.
Fig. 5 is a sectional view taken on line 5—5 of Fig. 2.
Figures 14, 15:
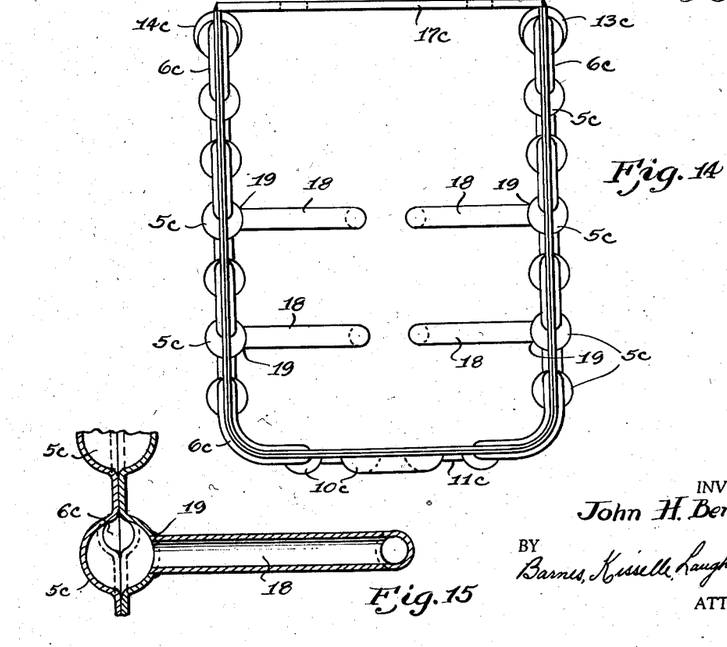
Fig. 15 is a fragmentary sectional view illustrating the preferred form of connecting the shelf defining tubes into the liquid reservoirs of the side walls.

In the evaporator shown in Figs. 1 to 5, the embossed portions formed in the outer and inner shells forming the side walls of the evaporator take the shape best shown in Fig. 2, wherein 5 represents the liquid reservoirs and 6 the reduced passages connecting the reservoirs. The gaseous passageways 6 formed by the matching embossed portions in the inner and outer shells 2 and 3 are much smaller in cross section than the liquid reservoirs 5 formed by other matching embossed portions, as is best illustrated in Fig. 4. Fig. 15 illustrates how the liquid reservoirs will be filled in the ordinary operation of the side walls of the evaporator.

The extended refrigerant surfaces formed in the top of the evaporator, as best shown in Figs. 1 and 4, takes the form of a continuous serpentine coil 7 formed in the outer shell, and independent parallel and spaced depressions 8 formed in the inner shell. In this case most of the dams are formed only at one end of each U-shaped loop, said dams being defined by the normal surfaces 9 of the top part of the inner shell; the continuous passageway 7 formed in the outer shell serving as a gas passageway. In the formation of the bottom wall of the evaporator, in the embodiment shown in Figs. 1 to 5, the outer shell is embossed as at 10 to form a continuous serpentine passageway similar to that formed by the embossed portion 7 at the top of the evaporator, except that short embossed portions 11 form the connecting means for the embossed portions 10 at the back edge of the evaporator so as to provide a gaseous space at the top of the liquid reservoirs formed by the embossed members 10. Short depressions 12 formed in the inner shell provide an additional gaseous connecting conduit and also serve as stops for ice trays.

The liquid level maintained in the side reservoirs 5 is indicated as at 5a, the level maintained in the top reservoirs 8 as at 8a, and the level maintained in the bottom reservoirs 10 as at 10a. Openings 13 and 14 define the ends of the continuous passage formed by the embossed portions 6, 7 and 11 and 5, 8 and 10, and either one of the openings 13 or 14 may be the inlet and the other the outlet. The two spaced reservoirs 8 at the center of the top of the evaporator terminate at points 15, as shown in Figs. 1 and 4, to form dams at the front of the evaporator. It will be understood that the other liquid reservoirs 8 at the ends of the top of the evaporator may also terminate at the front edge of the top shelf, as shown at 15, instead of being U-shaped.

It will be noted that by the novel arrangement of liquid reservoirs and gas passages on the bottom, top and side walls of the evaporator, the enlarged horizontal header portions or liquid reservoirs are connected in each case by smaller passageways so proportioned as to increase the gas velocity in passing through these smaller connecting passageways and therefore carry any overflow refrigerant or oil into the next reservoir or header portion whether above or below the preceding reservoir. Likewise the proportions are such that the gas velocity over the liquid refrigerant is relatively low thereby preventing the carrying over of liquid in quantities that would cause frost back either at the start or during the running cycle.

Figure 6:
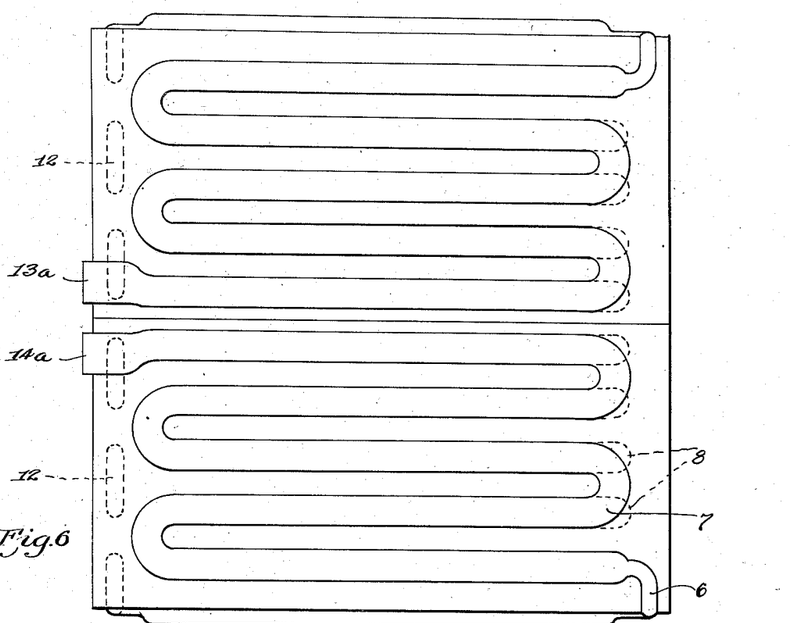
Figs. 6 and 7 are plan and front views, respectively, of a modified form of evaporator similar to that shown in Figs. 1 to 5, except that the fabricated walls are bent so that the inlet and outlet meet at the center top part of the evaporator.
Figure 7:
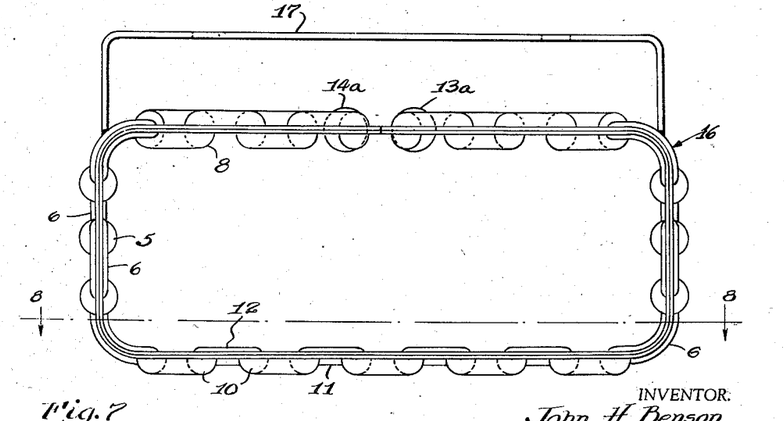
Figure 8:
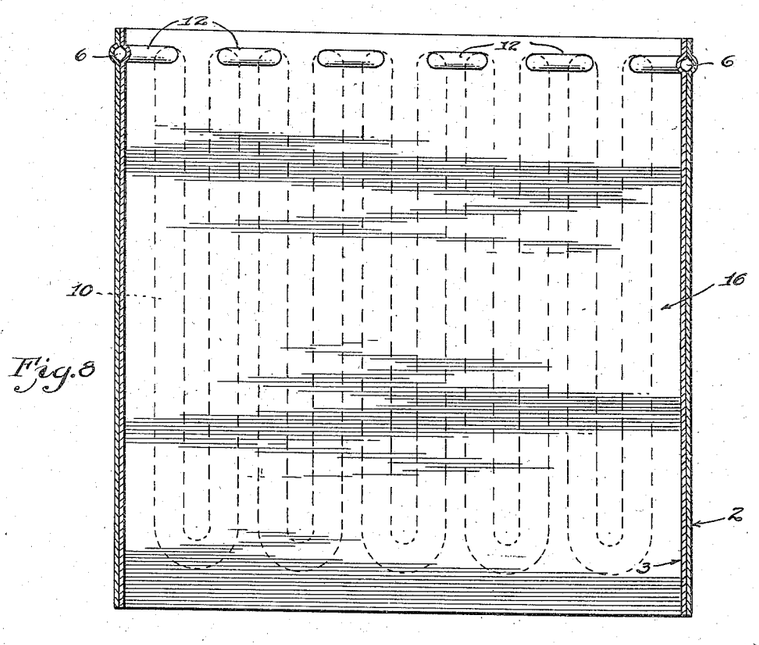
Fig. 8 is a sectional view taken on line 8—8 of Fig. 7.
Figure 9:
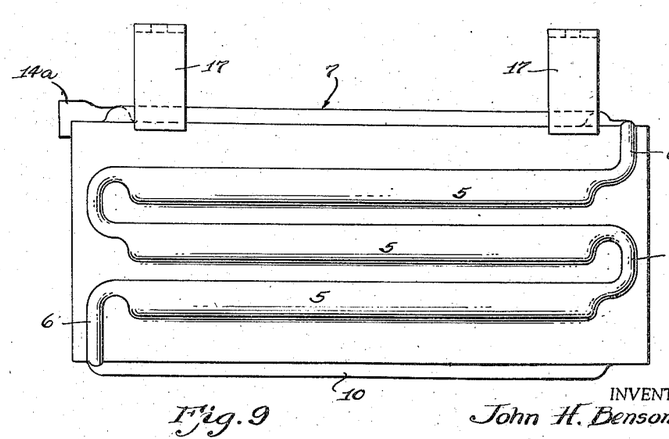
Fig. 9 is an end view of the unit shown in Figs. 6 and 7.

The evaporator structure illustrated in Figs. 6 to 9 is quite similar to that shown in Figs. 1 to 5, one of the main differences being that the inner and outer shells, after being superimposed and secured together, are so bent that the ends of the sheet meet at the top center, as shown in Figs. 6 and 7, instead of at the top and right as shown in Fig. 3. This evaporator is generally designated 16, and inasmuch as the liquid reservoirs and gas conduits are of the same construction as shown in Figs. 1 to 5, they are designated with the same numerals. Further modification lies in the fact that the U-ends of the serpentine coil 7 are arranged slightly different so that the liquid depressions 8 terminate at the front end of the evaporator to form dams to define the liquid reservoirs. This modification, like the embodiment illustrated in Figs. 1 to 5, can be fabricated from very thin metal, as the embossed portions forming the liquid reservoirs are distributed around the surface of the evaporator and therefore do not concentrate large stresses at any localized point, as is the case with evaporators having relatively large headers. The compact and light evaporator may be supported within the refrigerator cabinet by suitable hangers 17.

Figures 10, 11, 12:
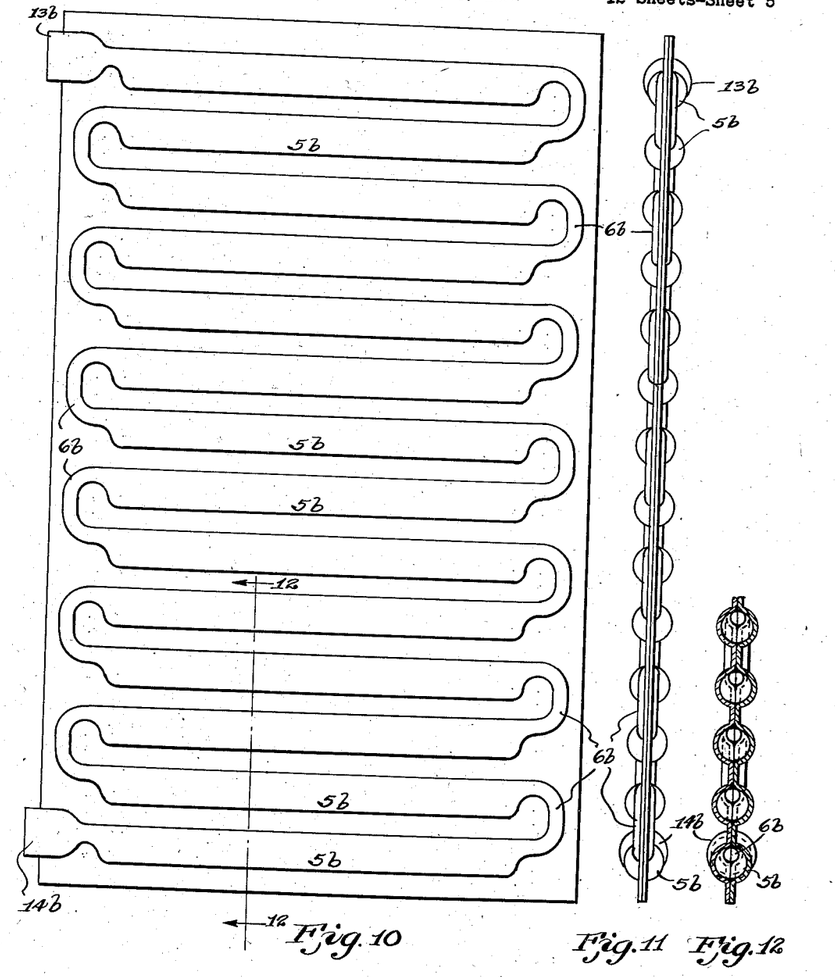
Fig. 10 illustrates a further modification in the adaptation of the present invention to flat cooling plates and showing particularly the relatively large liquid depressions connected together by the small passageways to form a complete unit in which the flow of refrigerant may be in either direction.
Fig. 11 is an end view of the structure shown in Fig. 10.
Fig. 12 is a sectional view taken on line 12—12 of Fig. 10.

In Figs. 10, 11 and 12, I have illustrated an evaporator embodiment that is particularly adapted for commercial work and air conditioning. The evaporator is in plate form and consists merely of two embossed metal sheets suitably secured together, such as by welding; for instance, there could be a continuous seam weld around the edges except for the openings 13b and 14b, and spot welding in between the embossed portions. The form of completed evaporator, as shown in Figs. 10 and 11, is quite similar to the form of evaporator shown in Figs. 3 and 7 prior to the bending step; however, the liquid reservoirs in the evaporator shown in Fig. 10 are all similar to those positioned in the side walls of the evaporators best shown in Figs. 3 and 7.

The refrigerant passages in this modification consist of the relatively large embossed portions 5b forming the liquid reservoirs and the portions 6b of relatively small cross section forming the connecting means for the portions 5b and also forming the dams at each end of such portions 5b. The simplicity, compactness and inexpensiveness of this evaporator is well illustrated in Figs. 10 and 11, and this is particularly true when it is remembered that this evaporator may be used with any type of control.

Figure 13:
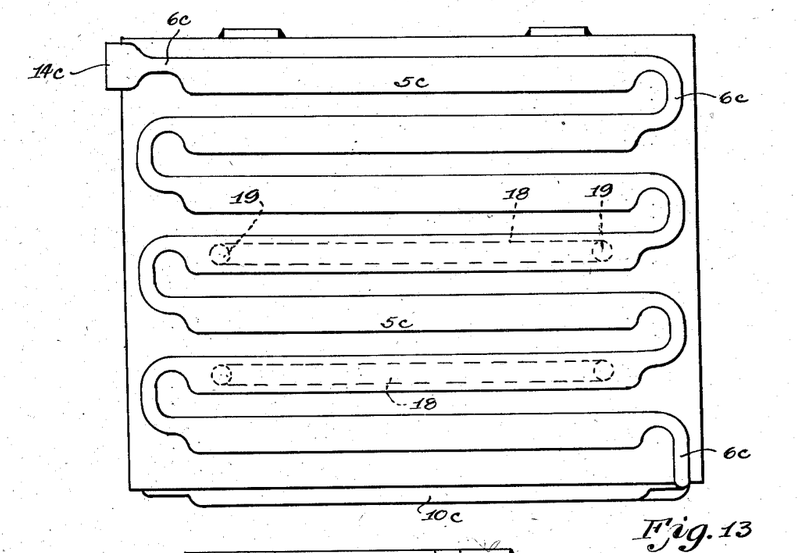
Figs. 13 and 14 are side and front views, respectively, of a modification similar to that shown in Fig. 7, but with the side walls vertical to form a U-shaped evaporator, an additional feature being the use of tubes connected into the liquid reservoirs for defining shelf supports.

In the modification illustrated in Figs. 13 to 15 I have shown what is in effect the bending of the plate shown in Fig. 11 into a U shaped evaporator, with the exception that the portion of the outer shell which forms the lower wall of the evaporator is embossed different than the side walls, and in a manner as previously described in connection with the evaporators shown in Figs. 3 and 7. In this modification the reduced passageways 6c form dams adjacent the openings 13c and 14c. This type of evaporator is particularly adapted for use with a large number of trays, and to increase the cooling effect I have provided simple tube members 18 of general U-shape and having their ends 19 connected into the embossed portions 5c. Carrying out the idea as in the other passageways in the evaporator, the tubes 18 are so connected into the embossed portions 5c that the upper wall of the tube is slightly above the liquid level maintained in the reservoir 5c; this preferred construction is well illustrated in Fig. 15.

Figure 16:
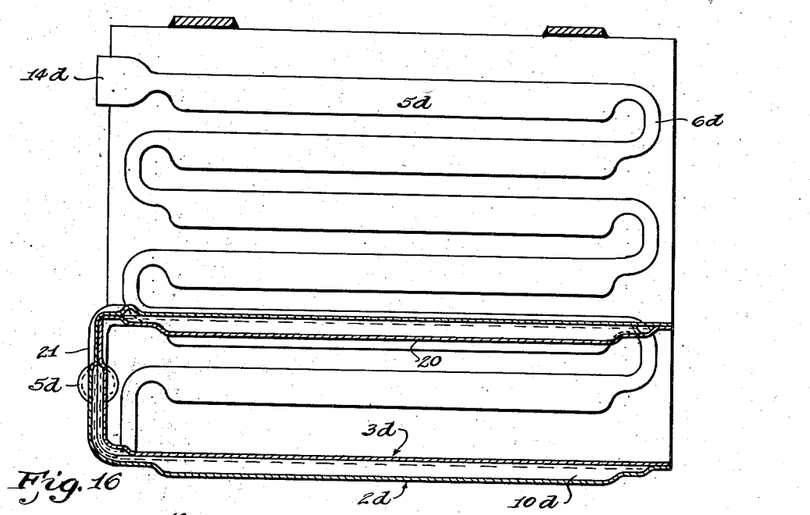
Fig. 16 illustrates a further modification wherein the initially flat walls of the evaporator are bent to form a shelf and vertical side walls, the spaced but connected small liquid depressions being formed as a part of the shelf.
Figure 17:
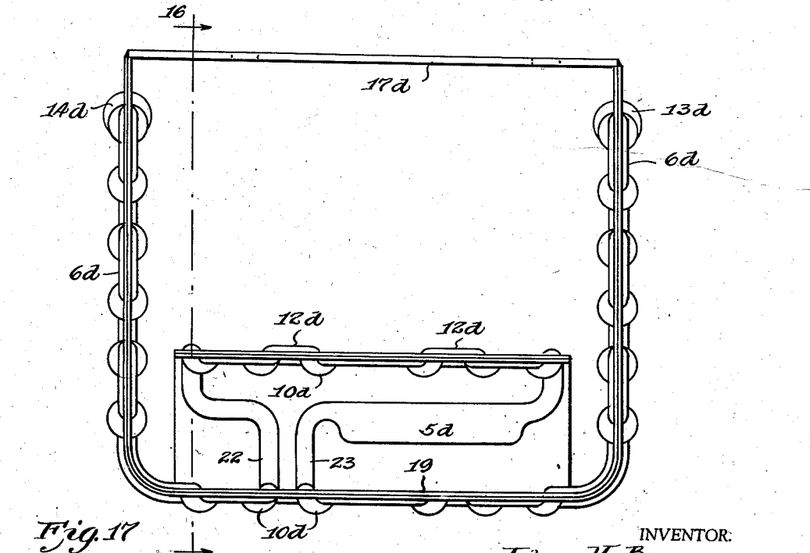
Fig. 17 is a front view of the structure shown in Fig. 13.

In Figs. 16 and 17 I have illustrated a further modification of the general U-shaped type of evaporator illustrated in Fig. 14, but in this modification the liquid and gas passageways and reservoirs are structurally associated with and connected to the liquid and gas passageways and reservoirs in the bottom wall of the evaporator. A feature of this modification is that the shelf structure and the other walls of the evaporator are preferably initially formed in the flat, the bottom wall 19 of the evaporator being the fulcrum about which the other walls are bent. It will be seen by referring to Fig. 16 that the bottom wall 20 of the shelf is a continuation of the inner shell 3d of the evaporator, and after the two shells of the evaporator are superimposed and welded together, the shelf structure may be bent to form the vertical portion 21 and the horizontal portion represented in part by the bottom wall 20, and the main side walls of the evaporator may be bent into vertical position as best shown in Fig. 17. The bottom wall 20 of the shelf is preferably embossed similarly to the bottom wall of the evaporator shown in Fig. 17, and the longitudinal liquid reservoirs 10d and the transverse reservoir 5d of the shelf structure are connected to the reservoirs 10d of the bottom wall of the evaporator structure by means of the conduits 22 and 23, which are similar in cross section to the gaseous passageways 6d.

Figure 18:
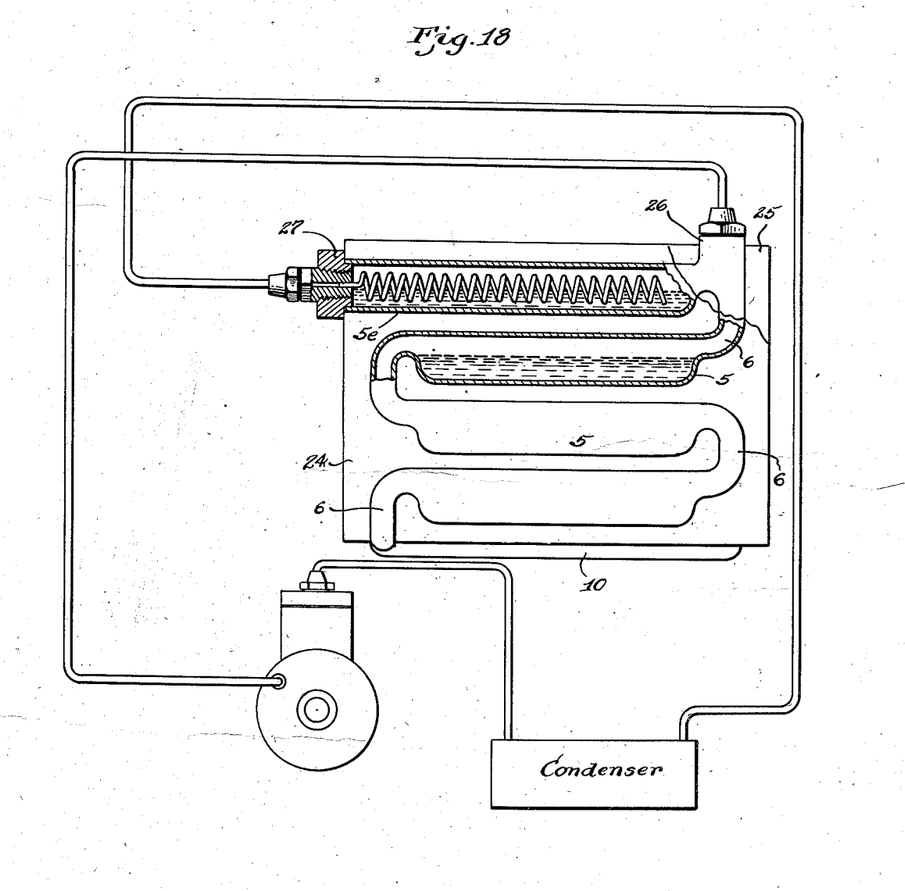
Fig. 18 is a largely diagrammatic view showing an evaporator embodying the present invention connected up to a complete refrigerating circuit, and illustrating particularly the adaptation of a capillary tube in an evaporator of the extended refrigerant surface type.

In Fig. 18 I have shown an extended refrigerant surface evaporator of the general type shown in the preceding figures and have illustrated diagrammatically the manner of connecting this evaporator into a refrigerant circuit of the type utilizing a capillary tube as the control means. One vertical wall of the evaporator is designated 24 and in this wall are formed the refrigerant reservoirs 5 and connecting passageways 6 of the same general structure as previously illustrated and described. The two top reservoirs of the wall 24 are cut away to illustrate the level of the liquid refrigerant maintained in the respective reservoirs. The top reservoir 5e contains a capillary tube with the end thereof immersed in the liquid, as is customary in other types of capillary tube flooded system evaporators, and a portion of the remainder of the capillary tube is also immersed in the liquid in this top reservoir 5e. It is also well to note here that in most systems using a capillary tube, the inlet is at the bottom of a relatively large mass of liquid refrigerant. The other wall of the evaporator, in the substantially diagrammatic showing of Fig. 18, is designated 25, the wall 24 being partly cut away at the upper right hand corner to permit the showing of the wall 25. While the wall 25 preferably has a top reservoir similar to the reservoir 5e, the outlet 26 is shown positioned adjacent the front edge of the evaporator, as a matter of convenience, as it will be obvious that this outlet may be positioned at any place along the top or at a point similar to the location of the inlet 27.

Figure 19:
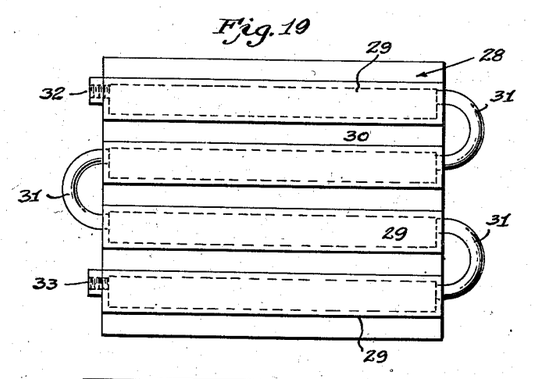
Figs. 19 and 20 represent side and end views respectively of a modification of my extended refrigerant surface evaporator wherein the liquid reservoirs and the base are formed from an extruded section, the extruded reservoirs being connected by U-tubes.
Figure 20:
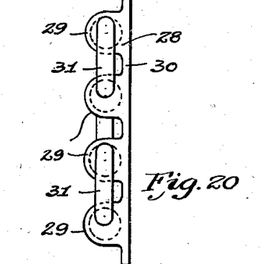

Figs. 19 and 20 represent a further modification of the invention as adapted to an extruded section. In this case an extruded section generally designated 28, of the type having spaced extruded conduits 29 and connecting webs 30, is utilized. The ends of the extruded conduits 29 are closed in and the top portions of the ends of adjacent conduits are connected by means of small U-tubes 31. Openings 32 and 33 may function either as inlets or outlets.

Figure 21:
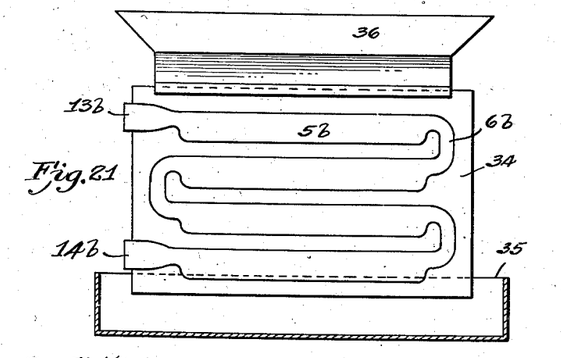
Figs. 21 and 22 are side and end views respectively of a further modification in the form of a milk cooler, the cooling portion thereof being in the form of an extended refrigerant surface plate evaporator.
Figure 22:
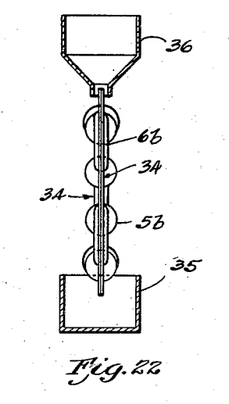

Figs. 21 and 22 illustrate a further modification and adaptation of the flat plate type of extended refrigerant surface evaporator, such as shown in Fig. 11. In this modification the flat plate generally designated 34 is shown with the same numeral designations as Figs. 10 and 11, inasmuch as the structure is substantially identical and may be of any height. The flat plate cooling unit is shown used in connection with a milk cooler. The figures are diagrammatic, but it will be understood that the flat plate cooling unit is carried by a bottom reservoir or container 35 for receiving the cooled milk and the top part of the flat plate 34 supports a funnel section 36 for receiving the milk to be cooled.

Figure 23:
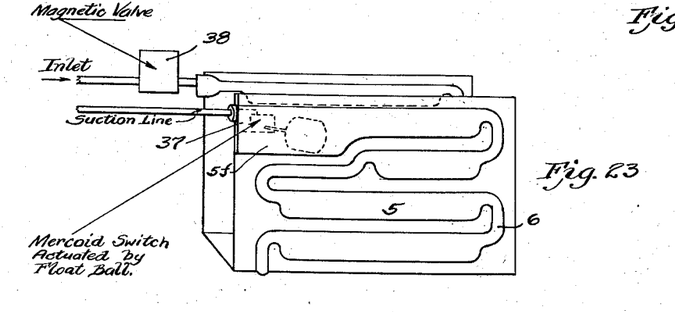
Fig. 23 illustrates a modified form of extended refrigerant surface evaporator wherein the liquid reservoir adjacent the outlet is slightly enlarged to receive a small float valve for controlling the flow of liquid into the evaporator.

The modification illustrated in Fig. 23 is similar to the embodiment shown in Fig. 18, and showing the top reservoir 5f, on one side, enlarged to receive a small float actuated switch 37; in this modification the reservoir 5f is connected to the suction line. The switch 37 may be electrically connected to a magnetic needle valve 38 which controls the flow of refrigerant to the evaporator.

Figures 24, 25:
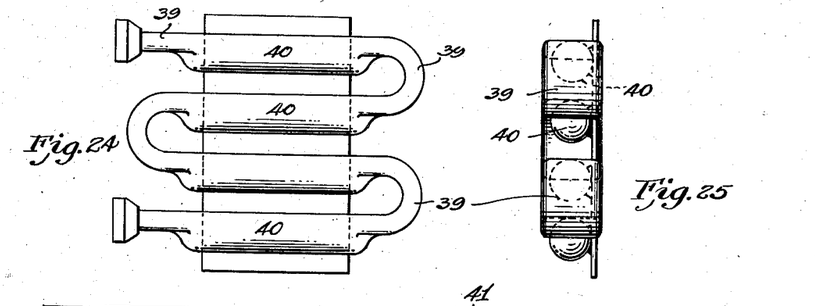
Figs. 24 and 25 are side and end views respectively, illustrating the manner of forming an extended refrigerant surface evaporator from a length of tubing by making portions thereof oval in shape.

In Figs. 24 and 25 I have illustrated a manner of fabricating an extended refrigerant surface evaporator section from relatively large diameter tubing. Portions of the tubing, as at 39, are flattened out, or formed in oval shape, to define refrigerant reservoirs 40; the flattened portions 39 being so formed as to lead into the top portions of the reservoir 40.

Figures 26, 27:
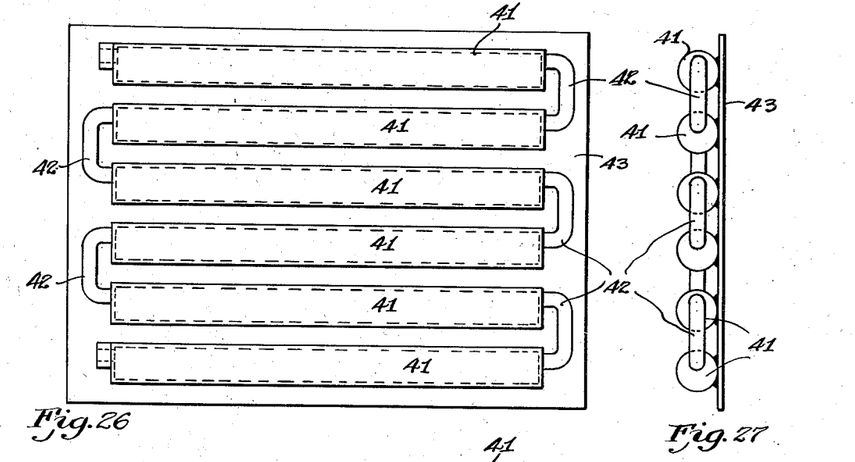
Figs. 26 and 27 are side and end views respectively of a further modified form of evaporator wherein the continuous passageway is formed by large diameter tubes connected together by smaller U-tubes.
Figure 28:
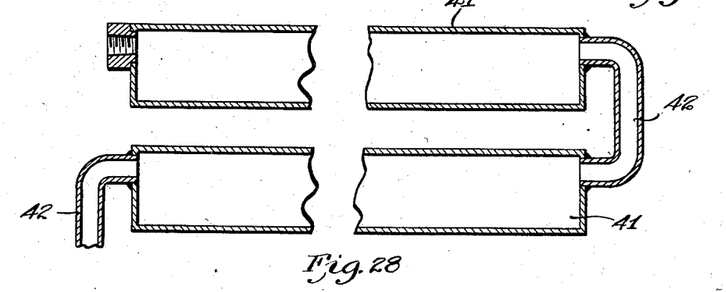
Fig. 28 is an enlarged longitudinal sectional view of the two top refrigerant chambers shown in Figs. 26 and 27.
Figures 29, 31:
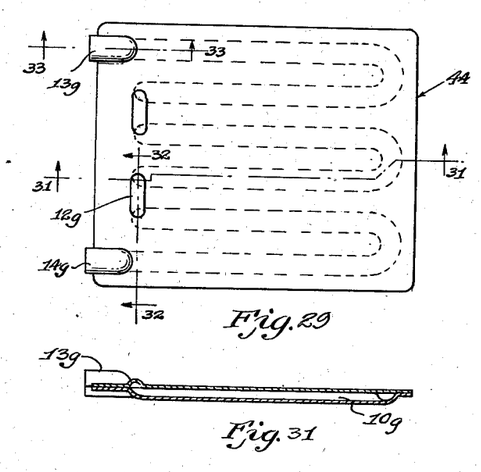
Figs. 29 and 30 are plan and end views respectively of a simple flat plate type of extended refrigerant surface evaporator.
Fig. 31 is a sectional view taken on line 31—31 of Fig. 29.
Figures 30, 32, 33:
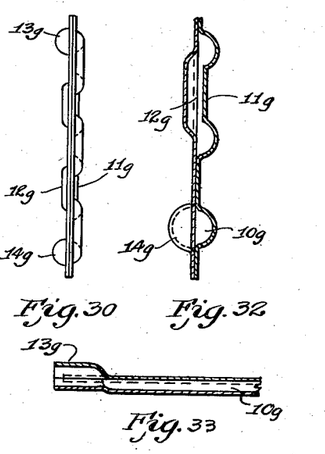
Fig. 32 is a sectional view taken on line 32—32 of Fig. 29.
Fig. 33 is a sectional view taken on line 33—33 of Fig. 29.

The modification illustrated in Figs. 26 to 28 is similar to that disclosed in Figs. 19 and 20, except that the refrigerant reservoirs 41 are formed of lengths of relatively large diameter tubing connected by smaller U-tubes 42, the large tube lengths 41 being suitably welded to a base or support member 43.

Figs. 29 to 33 illustrate my extended refrigerant surface evaporator as embodied in a flat plate evaporator, of the type adapted to be used in a horizontal position, as contrasted with the vertical type flat plate evaporator shown in Figs. 10 to 12. The construction of this simple, inexpensive flat plate evaporator generally designated 44 is similar to the bottom wall construction of the evaporator shown in Figs. 7 and 8, and the shelf structure in Figs. 16 and 17. The various elements of the plate shown in Figs. 29 to 33 are given numerals similar to those used in describing the lower wall of Figs. 4 and 7, and it will be seen that in this horizontal flat plate construction my general construction of liquid reservoirs and relatively small gas passageways is maintained and that there is a free gas passage throughout.

Figure 34:
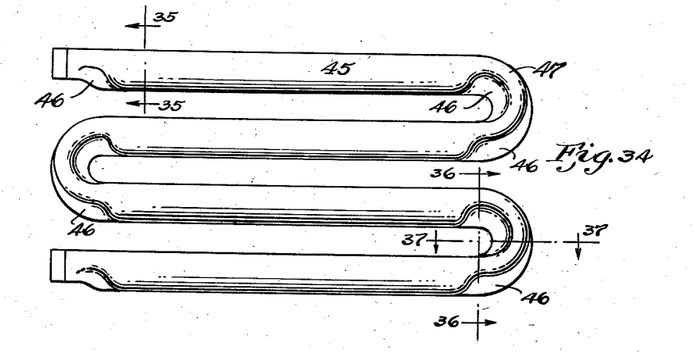
Fig. 34 illustrates a modified form of evaporator made from a single large diameter tube, the embodiment being similar to Fig. 24 with the exception that the portions of the tube are squeezed in to define the refrigerant reservoirs.
Figure 35:
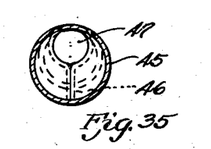
Figs. 35, 36, and 37 are sectional views taken on lines 35—35, 36—36 and 37—37, respectively, of Fig. 34.
Figure 36:
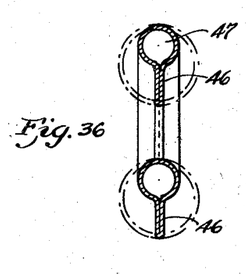
Figure 37:
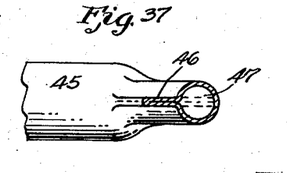

In Figs. 34 to 37 I have illustrated a further modification of the structure shown in Figs. 24 and 25, in that a continuous section of relatively large tubing is formed with spaced liquid reservoirs 45 by squeezing together certain portions of the tube as at 46, whereby to form the gaseous connecting passageways 47 of relatively small cross section; the queezed in portions being so located and of such shape as to connect together the top portions of the liquid reservoirs as best shown in Fig. 34.

Figure 38:
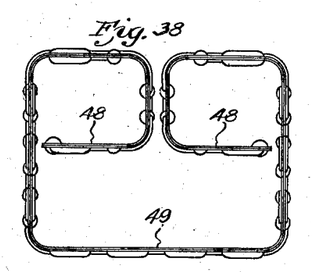
Figs. 38 and 39 represent further modified embodiments and showing two different shapes of evaporators for providing fast freezing tray surfaces.
Figure 39:
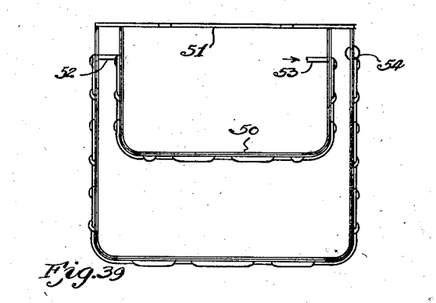

In Figs. 38 to 42 I have shown various embodiments of my extended refrigerant surface evaporator, particularly designed to provide fast freezing tray surfaces. It will be seen that the evaporator illustrated in Fig. 38 is similar to the evaporator shown in Fig. 7, with the exception that the walls are longer and have been folded over to provide additional freezing tray surfaces 48, in addition to the main bottom wall 49 of the evaporator. This type of evaporator is preferably formed by superimposing two flat sheets of metal, each of which have been embossed so as to provide suitable refrigerant reservoirs and gaseous connecting passageways for the respective vertical and horizontal surfaces, as previously described. This evaporator, as shown in Fig. 38, well illustrates the compactness and adaptability of my extended refrigerant surface evaporator when used with evaporators of large capacity. Very thin metal may be used and no space is wasted by large headers. In the modification shown in Fig. 39, one U-shaped type of extended refrigerant surface evaporator 50 may be nested inside another evaporator of the same general shape, both being suspended from a suitable hanger 51; in this case the two top reservoirs of adjacent walls of evaporators may be connected together as at 52, and one inlet or outlet located at 53 and the other at 54.

Figures 40, 41, 42:
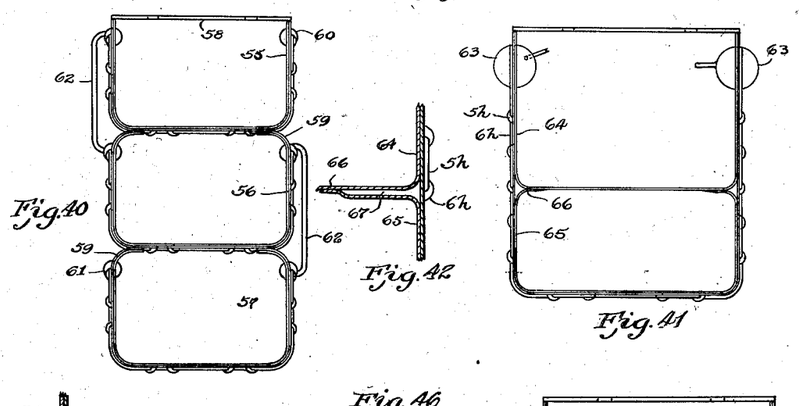
Fig. 40 illustrates a further modified embodiment wherein three separate extended refrigerant surface evaporators are connected together to form a plurality of fast freezing tray surfaces.
Fig. 41 illustrates a further modified embodiment wherein the inner shell is formed of two parts to provide an additional shelf.
Fig. 42 is a modified embodiment of the joint structure between the two parts of the inner shell.

Fig. 40 illustrates another manner of increasing the amount of fast freezing tray surfaces by connecting together three extended refrigerant surface evaporators 55, 56 and 57, the top evaporator being of plain U-shape type and provided with a hanger 58, and the top portions 59 of the other evaporators being bent inwardly to form a welding surface for connection to the bottom of the next above evaporator; the openings 60 and 61 may form the inlets or outlets of the complete unit, the uppermost liquid reservoirs in the respective evaporators being connected together by conduits 62.

In the modification illustrated in Fig. 41, I have shown a sheet metal evaporator in which the outer wall is of U-shape and, in addition to having embossed portions 5h with connecting passageways 6h of the type previously described, I have shown two larger headers 63 which form inlet and outlet headers. It will be understood from the showing in Figs. 39 and 41 that the embossed portion forming the liquid reservoirs and connecting conduits need not necessarily be formed in both the inner and outer shells of the evaporator, but may be formed in either the inner or the outer shell and still perform the same general function as where the embossed portions in the outer and inner shell are of identical shape. The inner walls of this evaporator may be formed of two separate parts, an upper portion 64 and a lower portion 65, the two inner walls being welded together as at 66, the joint between the inner walls 64 and 65 may be so shaped as to provide a reservoir 67 forming a continuation of the reservoir 6h of the same general construction and arrangement as illustrated in Fig. 15. The evaporator shown in Fig. 43 is similar in construction to that shown in Fig. 41 with the exception that the inner wall 68 is formed of a single piece of sheet metal.

Figures 43, 44, 45, 46:
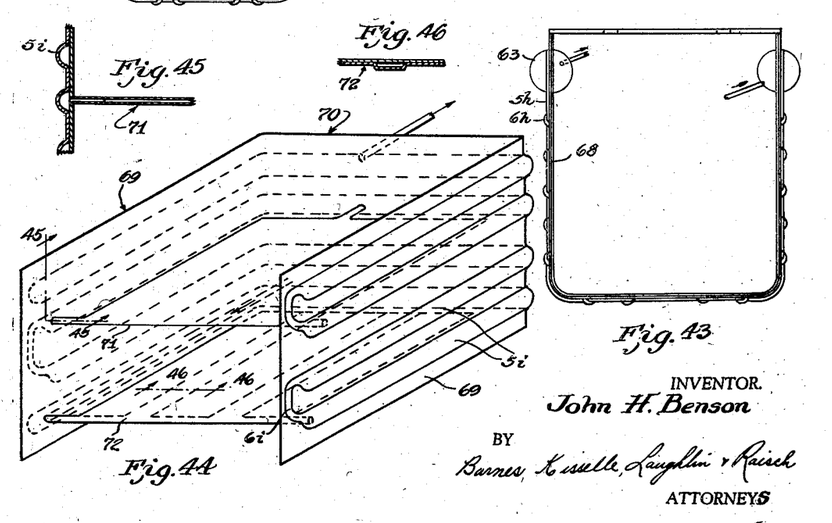
Fig. 43 illustrates a modification similar to Fig. 41, but showing the inner shell all in one piece.
Fig. 44 illustrates a further modified embodiment of the U shaped type wherein the walls are positioned in a horizontal plane and flooded shelves are provided in the plane of the horizontal refrigerant reservoirs.
Fig. 45 is a fragmentary section taken on line 45—45 of Fig. 44.
Fig. 46 is a section taken on lines 46—46 of Fig. 44.

In Figs. 44 to 46 I have illustrated an extended refrigerant surface evaporator of general U-shape but instead of having different types of reservoirs in different walls, this modification is so designed that the two legs 69 of the U-shaped evaporator are positioned horizontally and the base wall 70 forming an additional side wall instead of the usual bottom member. The liquid reservoirs are formed by embossed portions 5i extending in a horizontal plane around the three sides of the evaporator, the adjacent reservoirs being connected together by the conduits 6i of small cross section in the same manner as shown in Fig. 2. Flooded shelf members 71 and 72 are connected to and in the plane of certain of the horizontal reservoirs 5i.

It will be understood by those skilled in the art that my extended refrigerant surface evaporator is ideal for use with a capillary tube, and when used in combination with a capillary tube solves many problems encountered in the past when using a capillary tube with a standard flooded type evaporator. Actual tests of my extended refrigerant surface evaporator with various standard types of expansion valves, high side floats, and capillary tubes, showed remarkable overall performance. Recorded tests of these evaporators constructed in accordance with the disclosed embodiments herein showed approximately 37% to 60% running time in a 120° room, the variation being produced by the varying efficiency of different types of controls.

From the above preferred and modified embodiments of my invention, it will be seen that I have provided an evaporator the design of which adapts itself universally to all standard types of refrigerant controls; the operation of my evaporator is obvious from the drawings, see for instance, Fig. 18, where it will be seen that the liquid entering the reservoir 5e from the capillary tube will fill this reservoir to a predetermined level, when the liquid will pass on to the next horizontal reservoir and so on. The smaller passageways 6 connecting the enlarged horizontal reservoirs 5 are of such predetermined size as to increase the gas velocity to carry any overflow of refrigerant or oil into the next reservoir, whether above or below the preceding reservoir. It will be seen that the gas velocity over the liquid reservoirs is low thereby preventing the carrying over of liquid in quantities that would cause frost back in the return conduit, either at the start or during the running cycle. By dividing the available liquid into a plurality of relatively small reservoirs spaced around the walls of the evaporator, it will be seen that the amount of liquid in each horizontal reservoir is such that the evaporating gases have only a very short distance to travel to the gas space above the liquid, thus eliminating superheated gas pockets and oil logging. As will be seen in all the embodiments shown in the drawings, there can be no slugging over of liquid at the start of a cycle, because a free overhead gas passage is maintained throughout the evaporator.

It will further be seen that my novel construction is such that the continuous passage of gas over the liquid surfaces and the normal passage of surplus liquid in any given reservoir into the next, assures freedom from oil logging, insures a very small amount of oil on the surface and requires no special devices for the removal of oil. While the openings in the evaporator may be interchangeably used as inlet or outlet openings, the direction of flow of vaporized gases is always in one direction and hence there is no need for special manifolds or other means such as ebullitioners or the like. It will further be seen that by the inherent construction of my extended refrigerant surface evaporator that I obtain the maximum possible amount of evaporating surface area in proportion to the amount of refrigerant in the evaporator; the very small amount of oil on top of the small bodies of liquid is not objectionable.

It will be seen, in addition to its universal adaptation and great efficiency, that my evaporator is unusually compact, as a direct result of the novel features underlying the inherent evaporator design. In its preferred form the evaporator is of sheet metal construction, the sheets may be relatively thin and may be seam welded, spot welded, brazed or otherwise secured together. The sheet sub-assembly may be left either in the flat to form a shelf or plate evaporator, or may be bent into any shape desired to produce the necessary ice cube tray supports, or freezer shelves and exterior air cooling surfaces. There are no bottom or top joints to be welded nor are there any header cupped ends, flanges, header cross tube connections or special baffles or oil return devices.

What I claim is:

1. An evaporator for refrigerating systems, comprising a wall or walls for effecting transfer of heat units, and a continuous conduit arranged for the transfer of heat units to said wall or walls, portions of said conduit being enlarged to form a plurality of spaced shallow liquid reservoirs with gas chambers thereabove, and portions of said conduit connecting said adjacent reservoirs being formed to increase the velocity of refrigerant gases in passing from one reservoir to the next, said reservoirs and connecting portions being arranged to provide a continuous gas passage throughout the evaporator.

2. A sheet metal extended refrigerant surface evaporator adapted for universal application to various types of control units, comprising embossed portions formed substantially throughout the wall portions of the evaporator and arranged to form a conduit having continuous serpentine arranged portions, spaced portions of said conduit being enlarged to form a plurality of liquid refrigerant reservoirs, the portions of the conduit connecting the reservoirs being of such small cross-section as to give the gaseous refrigerant passing therethrough a materially greater velocity than when passing over the surface of the liquid in adjacent reservoirs.

3. A sheet metal extended refrigerant surface evaporator adapted for universal application to various types of control units, comprising embossed portions formed substantially throughout the wall portions of the evaporator and arranged to form a conduit having continuous serpentine arranged portions, spaced portions of said conduit being enlarged to form a plurality of liquid refrigerant reservoirs, the portions of the conduit connecting the reservoirs being of such small cross-section as to give the gaseous refrigerant passing therethrough a much greater velocity than when passing over the surface of the liquid in adjacent reservoirs, said reduced and enlarged portions being so arranged as to maintain a continuous free gas passageway throughout the evaporator.

4. A sheet metal extended refrigerant surface evaporator adapted for universal application to various types of control units, comprising embossed portions formed substantially throughout wall portions of the evaporator and cooperating with other wall portions to form a conduit, spaced portions of said conduit being enlarged to form a plurality of liquid refrigerant reservoirs and gas chambers, the portions of the conduit connecting the reservoirs being of such small cross-section as to give the gaseous refrigerant passing therethrough a much greater velocity than when passing over the surface of the liquid in adjacent reservoirs and effect operative distribution of liquid refrigerant to successive reservoirs irrespective of the direction of flow of refrigerant or planar position of the wall or walls of the evaporator.

5. A sheet metal extended refrigerant surface evaporator adapted for universal application to various types of control units, comprising embossed portions formed substantially throughout wall portions of the evaporator and arranged to form a continuous conduit, spaced portions of said conduit being enlarged to form a plurality of liquid refrigerant reservoirs, the portions of the conduit connecting the reservoirs being of such small cross-section as to give the gaseous refrigerant passing therethrough a greater velocity than when passing over the surface of the liquid in adjacent reservoirs, said reduced and enlarged portions being so arranged as to maintain a continuous free gas passageway throughout the evaporator and effect operative distribution of liquid refrigerant to successive reservoirs irrespective of the direction of flow of refrigerant or planar position of the wall or walls of the evaporator.

6. A sheet metal evaporator of the type having vertical and horizontal heat transfer walls, comprising horizontal embossed portions in the vertical wall or walls for forming liquid reservoirs, conduits of a smaller cross section than the cross section of the embossed portions forming the reservoirs for connecting the top parts of adjacent reservoirs and determining the height of liquid to be maintained in the reservoirs, a plurality of horizontal embossed portions in the horizontal wall or walls forming liquid reservoirs, and connecting means for said last named embossed portions for conveying gaseous refrigerant from one reservoir to the next and for defining the liquid level in the respective reservoirs.

7. A sheet metal evaporator of the type having vertical and horizontal heat transfer walls, comprising horizontal embossed portions in the vertical wall or walls for forming liquid reservoirs, conduits for connecting the top parts of adjacent reservoirs and determining the height of liquid to be maintained in the reservoirs, a plurality of horizontal embossed portions in the horizontal wall or walls forming liquid reservoirs, and connecting means for said last named embossed portions for conveying gaseous refrigerant from one reservoir to the next and for defining the liquid level in the respective reservoirs.

8. A sheet metal evaporator of the type having vertical and horizontal heat transfer walls, comprising horizontal embossed portions in the vertical wall or walls for forming liquid reservoirs, conduits for connecting the top parts of adjacent reservoirs and determining the height of liquid to be maintained in the reservoirs, a plurality of horizontal embossed portions in the horizontal wall or walls forming liquid reservoirs, and connecting means for said last named embossed portions for conveying gaseous refrigerant from one reservoir to the next and for defining the liquid level in the respective reservoirs, all of said reservoirs and connecting means being arranged to form a continuous conduit of varying cross section and a part of all of said horizontal passages in any given wall lying within the plane of that wall.

9. A sheet metal evaporator formed of embossed superimposed sheets of metal, said superimposed sheets being bent to form vertical and horizontal heat exchange walls, certain of the embossed portions in the vertical wall or walls matching to form a plurality of horizontally positioned liquid reservoirs substantially cylindrical in cross section and with certain other embossed portions matching to form reservoir connecting conduits of relatively small cross section, embossed portions in one of the sheets of said horizontal wall or walls cooperating with the other superimposed sheet to form spaced horizontal liquid reservoirs substantially semi-spherical in cross section, and connecting embossed portions for said reservoirs in the bottom wall so shaped and positioned as to define a liquid level below the top of said reservoirs.

10. A sheet metal evaporator formed of embossed superimposed sheets of metal, said superimposed sheets being bent to form vertical and horizontal heat exchange walls, certain of the embossed portions in the vertical wall or walls matching to form a plurality of horizontally positioned liquid reservoirs substantially cylindrical in cross section and certain other embossed portions matching to form reservoir connecting conduits, embossed portions in one of the sheets of said horizontal wall or walls cooperating with the other superimposed sheet to form spaced horizontal liquid reservoirs, and connecting embossed portions between said reservoirs in the bottom wall and the reservoirs in the vertical wall or walls.

11. In a refrigerating system a sheet metal evaporator formed of embossed superimposed sheets of metal, said superimposed sheets being bent to form vertical and horizontal heat exchange walls, certain of the embossed portions in the vertical wall or walls matching to form a plurality of horizontally positioned liquid reservoirs substantially cylindrical in cross section and certain other embossed portions matching to form reservoir connecting conduits, embossed portions in one of the sheets of said horizontal wall or walls cooperating with the other superimposed sheet to form spaced horizontal liquid reservoirs, and connecting embossed portions for said reservoirs in the bottom wall so shaped and positioned as to define a liquid level below the top of said reservoirs, all of said embossed portions and all the walls being connected together to form a continuous unobstructed gas conduit.

12. A refrigerant evaporator comprising one or more heat exchange walls, portions of said wall or walls being formed to provide relatively long chambers, and connecting conduits so shaped and positioned as to form dams at the ends of the chambers whereby to form spaced shallow reservoirs of liquid refrigerant throughout the heat transfer walls of the evaporator, the dam forming conduits being so shaped and positioned as to materially increase the velocity of gas in between the reservoirs whereby to carry the surplus liquid and oil in one reservoir up or down to the next reservoir.

13. A refrigerant evaporator comprising one or more heat exchange walls, portions of said wall or walls being formed to provide relatively long chambers, and connecting conduits so shaped and positioned as to form dams at the ends of the chambers whereby to form spaced shallow reservoirs of liquid refrigerant scattered over the heat transfer walls of the evaporator and a gas space above each body of refrigerant, the dam forming conduits being so shaped and positioned as to materially increase the velocity of gas in between the reservoirs whereby to carry the surplus liquid and oil in one reservoir up or down to the next reservoir.

14. A sheet metal evaporator comprising vertical and horizontal walls, embossed portions forming a continuous conduit over the heat transfer surfaces of said walls, the cross sectional dimensions of portions of said continuous conduit varying to provide a series of relatively long and shallow liquid reservoirs connected by relatively short gas conduits.

15. A sheet metal evaporator comprising vertical and horizontal walls, embossed portions forming a continuous conduit over the heat transfer surfaces of said walls, the cross sectional dimensions of portions of said continuous conduit varying to provide a series of relatively long and shallow liquid reservoirs connected by relatively short gas conduits of relatively small cross section.

16. A sheet metal evaporator comprising vertical and horizontal walls, embossed portions forming a passageway over the heat transfer surfaces of said walls, said passageway being open to the flow of gases from the inlet to the outlet of the evaporator, the cross sectional dimensions of said passageway varying to provide a series of relatively long and shallow liquid reservoirs connected by relatively short gas conduits of relatively small cross section, the connecting together of the reservoirs and gas conduits being such as to provide a predetermined height of liquid in each reservoir for maintaining a continuous gaseous passageway throughout the evaporator.

17. A sheet metal evaporator comprising vertical and horizontal walls, embossed portions forming a continuous conduit over the heat transfer surfaces of said walls, the cross sectional dimensions of portions of said continuous conduit varying to provide a series of relatively long and shallow liquid reservoirs connected by relatively short gas conduits, the horizontal wall of said evaporator including a shelf structure.

18. A sheet metal evaporator comprising vertical and horizontal walls, embossed portions forming a continuous conduit over the heat transfer surfaces of said walls, the cross sectional dimensions of said continuous conduit varying to provide a series of relatively long and shallow liquid reservoirs connected by relatively short gas conduits, and a horizontally positioned conduit connected into one of the reservoirs of the vertical wall or walls and forming a sharp freezing surface.

19. An evaporator for refrigerating systems, comprising a wall or walls for effecting transfer of heat units, and a continuous conduit conductively associated with said wall or walls, portions of said conduit being enlarged to form a plurality of spaced liquid reservoirs and gas chambers, certain of said reservoirs and gas chambers being so arranged as to maintain a continuous free gas passageway throughout the evaporator and a refrigerant control unit in the form of a capillary tube projecting into one of said liquid reservoirs.

20. An evaporator for refrigerating systems, comprising a wall or walls for effecting transfer of heat units, and a continuous conduit conductively associated with said wall or walls, portions of said conduit being enlarged to form a plurality of spaced liquid reservoirs and gas chambers, certain of said reservoirs and gas chambers being so arranged as to maintain a continuous free gas passageway throughout the evaporator and a refrigerant control unit in the form of a capillary tube projecting into and at least partially immersed in the liquid in one of said reservoirs.

21. An evaporator for refrigerating systems, comprising a wall or walls for effecting transfer of heat units, and a conduit conductively associated with said wall or walls, portions of said conduit being enlarged to form a plurality of spaced liquid reservoirs, and portions of said conduit connecting said adjacent reservoirs being formed to increase the velocity of refrigerant gases in passing from one reservoir to the next, the flow of refrigerant in said continuous conduit being reversible whereby a refrigerant control may be connected into either end of the conduit.

22. An evaporator for refrigerating systems, comprising a wall or walls for effecting transfer of heat units, and a continuous unobstructed gas conduit arranged for the transfer of heat units to said wall or walls, portions of said conduit being enlarged to form a plurality of spaced shallow liquid reservoirs with gas chambers thereabove, and portions of said conduit connecting said adjacent reservoirs being formed to materially increase the velocity of refrigerant gases in passing from one reservoir to the next during normal operation of the system.

23. In an evaporator for refrigerating systems, a continuous conduit shaped to define a heat exchange surface or surfaces, portions of said conduit being enlarged to form a plurality of relatively long spaced gas chambers and shallow liquid reservoirs to form a plurality of horizontally positioned extended refrigerant surfaces, and portions of said conduit connecting certain of said adjacent reservoirs and gas chambers and being formed to materially increase the velocity of refrigerant gases in passing from one reservoir to the next.

JOHN H. BENSON.